(12) United States Patent
Frank et al.

(10) Patent No.: US 7,201,399 B2
(45) Date of Patent: Apr. 10, 2007

(54) FOUR-POINT SEAT BELT SYSTEM WITH BUCKLE-LOWERING BELTS

(75) Inventors: Matthew C. Frank, Rochester Hills, MI (US); Alex G. Meduvsky, Romeo, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 335 days.

(21) Appl. No.: 10/680,835

(22) Filed: Oct. 7, 2003

(65) Prior Publication Data

US 2005/0082815 A1    Apr. 21, 2005

(51) Int. Cl.
*B60R 22/00* (2006.01)

(52) U.S. Cl. .................. 280/801.1; 280/807; 297/468; 297/484

(58) Field of Classification Search ............. 280/801.1, 280/806, 807, 808; 297/468, 484, 474, 475, 297/486
See application file for complete search history.

(56) References Cited

U.S. PATENT DOCUMENTS

| | | | | |
|---|---|---|---|---|
| 4,738,413 A | * | 4/1988 | Spinosa et al. | ......... 244/151 R |
| 4,927,211 A | * | 5/1990 | Bolcerek | ..................... 297/465 |
| 5,306,044 A | * | 4/1994 | Tucker | ..................... 280/801.1 |
| 5,524,928 A | * | 6/1996 | Monagas | ..................... 280/808 |
| 6,309,024 B1 | * | 10/2001 | Busch | ......................... 297/484 |
| 6,655,744 B2 | * | 12/2003 | Petri et al. | .................. 297/478 |
| 6,817,629 B2 | * | 11/2004 | Herberg et al. | .......... 280/801.1 |
| 2003/0034686 A1 | | 2/2003 | Soderstrom et al. | |

* cited by examiner

*Primary Examiner*—Paul N. Dickson
*Assistant Examiner*—Toan C. To
(74) *Attorney, Agent, or Firm*—Tarolli, Sundheim, Covell & Tummino LLP

(57) ABSTRACT

An occupant restraint system (30) includes first and second lap belts (32 and 34) for collectively extending across a lap of the occupant (22). First and second shoulder belts (36 and 38) extend over the shoulders of the occupant (22). A buckle assembly (58) interconnects the lap belts (32 and 34) and the shoulder belts (36 and 38). The occupant restraint system (30) also includes first and second buckle-lowering belts (94 and 96) attached to the buckle assembly (58) for creating a downwardly acting biasing force on the buckle assembly (58) so as to move the buckle assembly (58) downwardly relative to the seat (10) and towards the lap of the occupant (22).

33 Claims, 4 Drawing Sheets

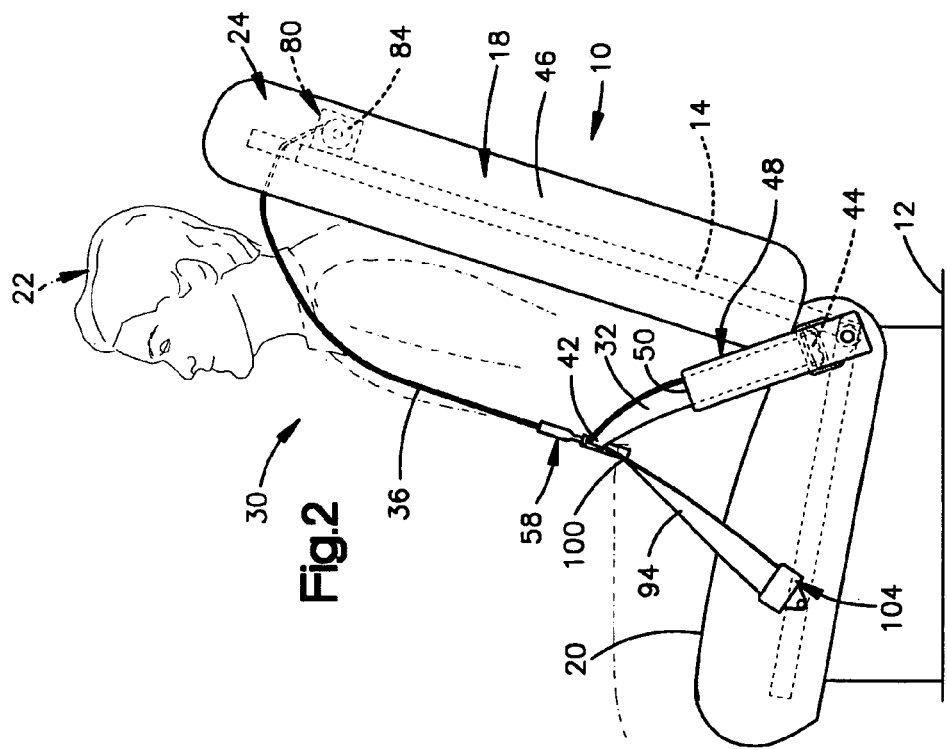
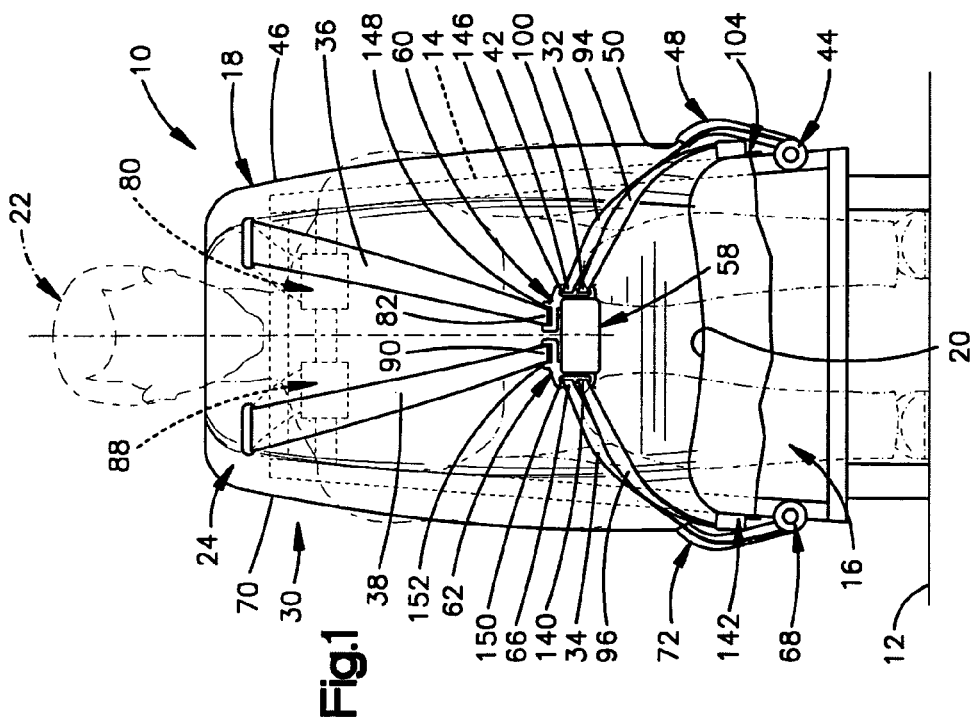

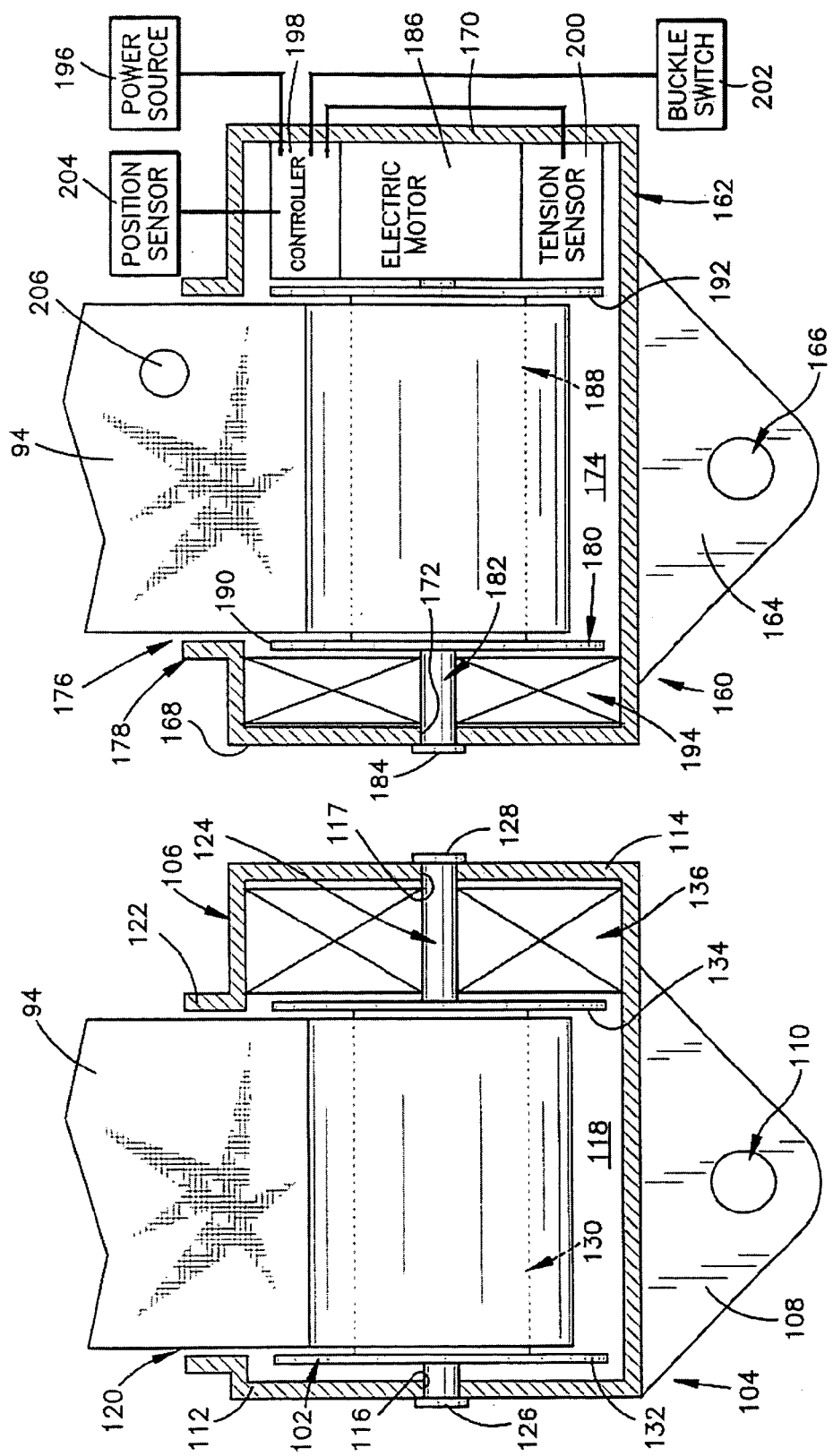

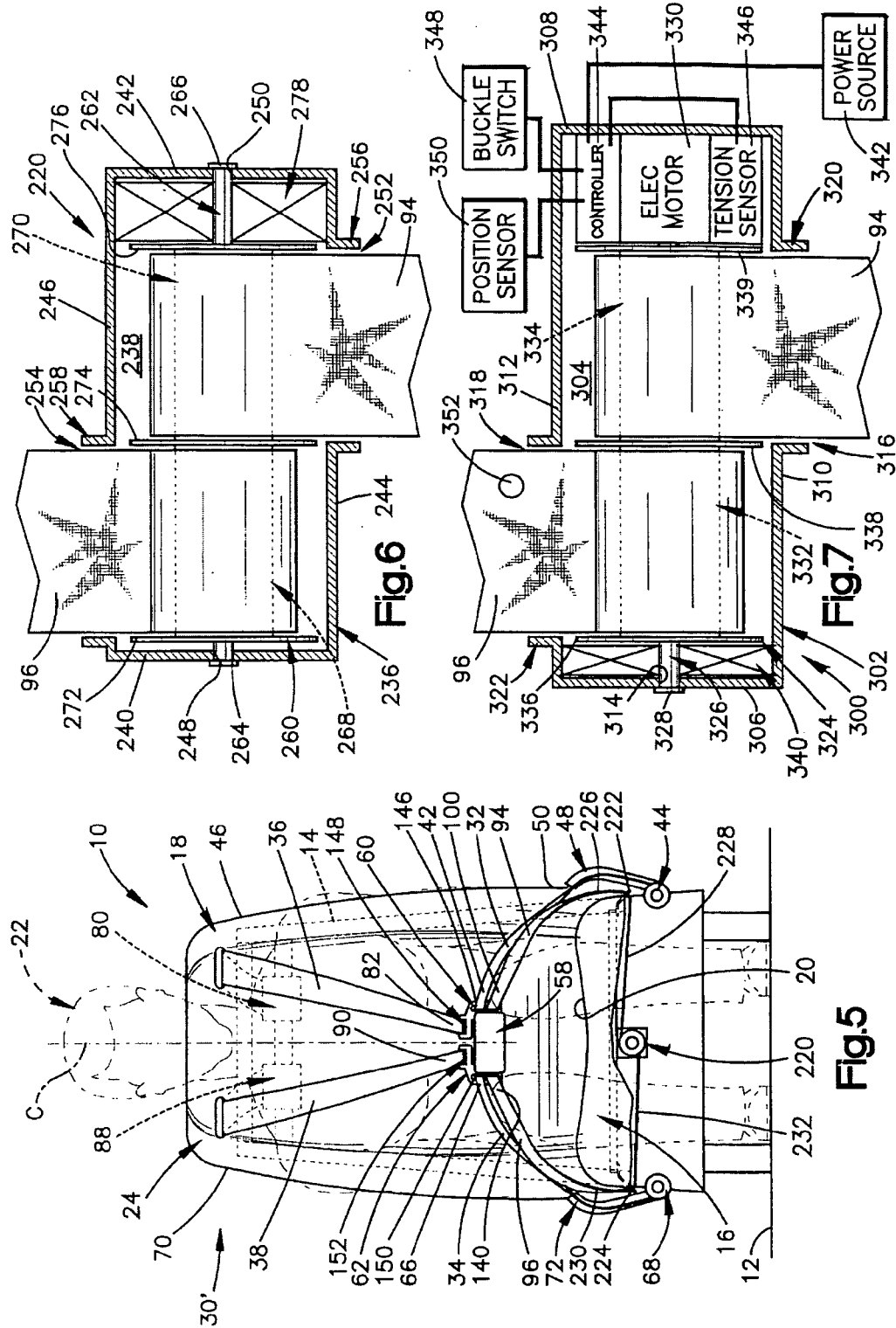

FOUR-POINT SEAT BELT SYSTEM WITH BUCKLE-LOWERING BELTS

TECHNICAL FIELD

The present invention relates to an occupant restraint system for a seat of a vehicle. More particularly, the present invention relates to a four-point seat belt system having buckle-lowering belts for maintaining a buckle assembly adjacent to the top of the lap of an occupant of the seat.

BACKGROUND OF THE INVENTION

A conventional four-point seat belt system for a seat of a vehicle includes two lap belts and two shoulder belts. A first lap belt extends upwardly from a first lap belt retractor mounted on a right side of the vehicle seat and is fixed to a first portion of a buckle assembly. A second lap belt extends upwardly from a second lap belt retractor mounted on a left side of the vehicle seat and is fixed to a second portion of the buckle assembly. A first shoulder belt extends from a first shoulder belt retractor downward to the first portion of the buckle assembly. A second shoulder belt extends from a second shoulder belt retractor downward to the second portion of the buckle assembly. The first and second portions of the buckle assembly latch together to secure the four-point seat belt system about an occupant of the seat.

When the four-point seat belt system is secured about the occupant, it is desirable to maintain the buckle assembly adjacent the top of the lap of the occupant. The positioning of the buckle assembly adjacent the top of the lap of the occupant helps to prevent the occupant from "submarining" or sliding forward on the cushion portion of the seat under the buckle assembly during the occurrence of a crash condition.

A conventional four-point seat belt system provides lap belt retractors with rewind springs that are stronger than the rewind springs of the shoulder belt retractors in order to position the buckle assembly adjacent the top of the occupant's lap. At the same time, however, the lap belt retractors must be positioned relative to the occupant to help to restrain the occupant in the seat in the event of a crash condition. The lap belt retractors are therefore generally positioned rearward of the lap of the occupant. As a result of the rearward positioning of the lap belt retractors, the rewind springs of the lap belt retractors tend to pull the buckle assembly both downward relative to the seat and rearward against the torso of the occupant. The rearward force of the buckle assembly against the torso of the occupant results in an increased frictional resistance to downward movement of the buckle assembly. As a result, the buckle assembly may become positioned away from the top of the lap of the occupant.

SUMMARY OF THE INVENTION

The present invention relates to an occupant restraint system for helping to protect an occupant of a seat of a vehicle. The occupant restraint system comprises first and second lap belts for collectively extending across a lap of the occupant. First and second shoulder belts extend over the shoulders of the occupant. A buckle assembly interconnects the lap belts and the shoulder belts. The occupant restraint system also comprises first and second buckle-lowering belts attached to the buckle assembly for creating a downwardly acting biasing force on the buckle assembly so as to move the buckle assembly downwardly relative to the seat and towards the lap of the occupant.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 illustrates a four-point seat belt system constructed in accordance with the present invention;

FIG. 2 is a side view of the four-point seat belt system of FIG. 1;

FIG. 3 is an enlarged cutaway view of a buckle-lowering retractor for the four-point seat belt system of FIG. 1;

FIG. 4 is an enlarged cutaway view of an alternative buckle-lowering retractor for the four-point seat belt system of FIG. 1;

FIG. 5 illustrates a four-point seat belt system constructed in accordance with a second embodiment of the present invention;

FIG. 6 is an enlarged cutaway view of a buckle-lowering retractor for the four-point seat belt system of FIG. 5;

FIG. 7 is an enlarged cutaway view of an alternative buckle-lowering retractor for the four-point seat belt system of FIG. 5;

DESCRIPTION OF PREFERRED EMBODIMENT

Figure 10:
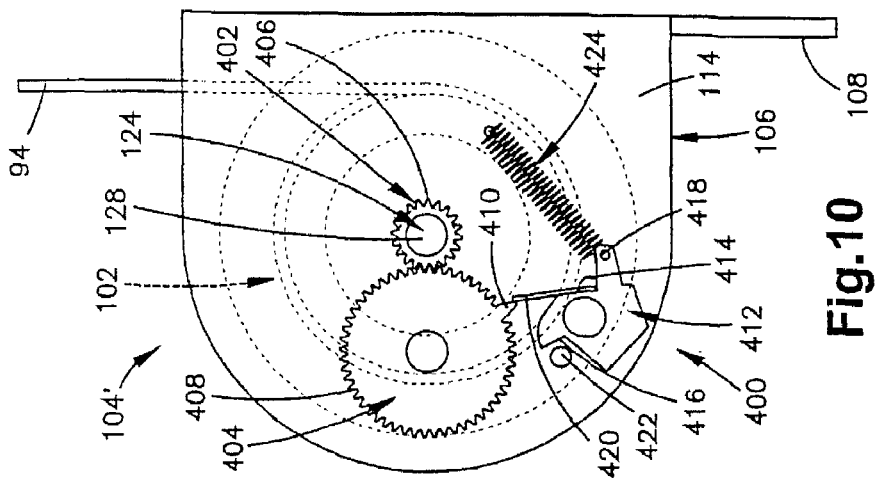
FIG. 10 illustrates the buckle-lowering retractor of FIG. 8 with the mechanism in a condition returning the additional length of the buckle-lowering belt to the buckle-lowering retractor.

FIGS. 1 and 2 illustrate a seat 10 for a vehicle 12. The seat 10 includes a frame 14 that is secured to the vehicle 12 in a known manner. The seat 10 also includes a cushion portion 16 and a backrest portion 18. The cushion portion 16 includes an upper surface 20 upon which a vehicle occupant 22 sits. The backrest portion 18 extends upwardly from the cushion portion 16. An upper portion 24 of the backrest portion 18 of the seat 10 is located adjacent the shoulders of the seated occupant 22.

FIGS. 1 and 2 also illustrate a four-point seat belt system 30 constructed in accordance with the present invention for helping to retain the occupant 22 in the seat 10. The four-point seat belt system 30 includes lap belts 32 and 34 and shoulder belts 36 and 38. Each lap belt 32 and 34 extends over a portion of the lap of the seated occupant 22 so that lap belts 32 and 34 collectively extend across the occupant's lap. Each shoulder belt 36 and 38 extends over an associated shoulder of the occupant 22.

Lap belt 32 has opposite first and second ends. The first end 42 of lap belt 32 is attached to a tongue portion 60 (FIG. 1) of a buckle assembly 58 and a second end (not shown) of lap belt 32 is secured to a spool (not shown) of a lap belt retractor 44. The lap belt retractor 44 is mounted to the frame 14 of the seat 10 in a location adjacent the left side 46 of the seat. Alternatively, the lap belt retractor 44 may be mounted to the floor 12 of the vehicle adjacent the left side 46 of the seat 10.

The lap belt retractor 44 includes a rewind spring (not shown) and a locking mechanism (not shown). The rewind spring is connected with the spool and applies a force to the spool for rotating the spool in a direction for retracting lap belt 32. The locking mechanism is of a known design and is responsive to a predetermined deceleration of the vehicle 12 for preventing rotation of the spool of the lap belt retractor 44 in a direction enabling withdrawal of lap belt 32. Alternatively, the locking mechanism may be responsive to a predetermined rotational acceleration of the spool.

A belt guide 48 is associated with lap belt retractor 44 and guides lap belt 32 from the lap belt retractor to a location above the upper surface 20 of the cushion portion 16 of the seat 10. The guide 48 has a central conduit through which the lap belt extends. The lap belt 32 exits the guide 48 through an open upper end 50 of the guide.

Lap belt 34 has opposite first and second ends. The first end 66 of lap belt is attached to a buckle portion 62 of the buckle assembly 58 and a second end (not shown) of lap belt 34 is secured to a spool (not shown) of a lap belt retractor 68. The lap belt retractor 68 is mounted to the frame 14 of the seat 10 at a location adjacent the right side 70 of the seat. Alternatively, the lap belt retractor 68 may be mounted to the floor of the vehicle 12 adjacent the right side 70 of the seat 10.

The lap belt retractor 68 is similar in design to the lap belt retractor 44. The lap belt retractor 68 also includes a rewind spring (not shown) and a locking mechanism (not shown). The rewind spring is connected with the spool and applies a force to the spool for rotating the spool in a direction for retracting lap belt 34. The locking mechanism is of a known design and is responsive to a predetermined deceleration of the vehicle 12 for preventing rotation of the spool of the lap belt retractor 68 in a direction enabling withdrawal of lap belt 34. Alternatively, the locking mechanism may be responsive to a predetermined rotational acceleration of the spool.

A belt guide 72 is associated with lap belt retractor 68 and guides lap belt 34 from the lap belt retractor to a location above the upper surface 20 of the cushion portion 16 of the seat 10. The guide 72 for lap belt 34 is similar to the guide 48 for lap belt 32. The guide 72 has a central conduit through which the lap belt 34 extends. The lap belt 34 exits the guide 72 through an open upper end 74 of the guide.

Shoulder belt 36 has a first end (not shown) that is connected to a shoulder belt retractor 80. As shown in FIG. 2, the shoulder belt retractor 80 is mounted to the frame 14 of the backrest portion 18 of the seat 10. A second end 82 of shoulder belt 36 is attached to the tongue portion 60 of the buckle assembly 58. When the occupant 22 is seated in the seat 10, as shown in FIGS. 1 and 2, shoulder belt 36 extends over the left shoulder of the occupant 22.

Shoulder belt retractor 80 includes a spool 84 (FIG. 2). The first end of shoulder belt 36 is secured to the spool 84 of shoulder belt retractor 80 and a portion of shoulder belt 36 is wound around the spool. Shoulder belt retractor 80 also includes a rewind spring (not shown) and a locking mechanism (not shown). The rewind spring is connected with the spool 84 and applies a force to the spool for rotating the spool in the clockwise direction, as viewed in FIG. 2. The strength of the rewind spring of shoulder belt retractor 80 is less than the strength of the rewind spring of lap belt retractor 44. In other words, the rewind spring of shoulder belt retractor 80 applies a rewind force to the spool 84 of the shoulder belt retractor 80 that is less than the rewind force of the rewind spring of lap belt retractor 44. The locking mechanism is of a known design and is responsive to a predetermined deceleration of the vehicle 12 or a predetermined rotational acceleration of the spool 84 for preventing rotation of the spool of the shoulder belt retractor 80 in a counter-clockwise direction, as viewed in FIG. 2.

Shoulder belt 38 has a first end (not shown) that is connected to a shoulder belt retractor 88. The shoulder belt retractor 88 is mounted to the frame 14 of the backrest portion 18 of the seat 10 and is similar in design to the shoulder belt retractor 80. A second end 90 of shoulder belt 38 is attached to the buckle portion 62 of the buckle assembly 58. When the occupant 22 is seated in the seat 10, as shown in FIG. 1, shoulder belt 38 extends over the right shoulder of the occupant 22. Shoulder belt retractor 88 also includes a rewind spring (not shown) and a locking mechanism (not shown). The strength of the rewind spring of shoulder belt retractor 88 is less than the strength of the rewind spring of lap belt retractor 68. In other words, the rewind spring of shoulder belt retractor 88 applies a rewind force to the spool of the shoulder belt retractor 88 that is less than the rewind force of the rewind spring of lap belt retractor 68.

The four-point seat belt system 30 also includes buckle-lowering belts 94 and 96. Buckle-lowering belt 94 has opposite first and second ends. The first end 100 of buckle-lowering belt 94 is attached to the tongue portion 60 of the buckle assembly 58 and a second end (not shown) of buckle-lowering belt 94 is secured to a spool 102 (FIG. 3) of a buckle-lowering retractor 104. As shown in FIG. 2, the buckle-lowering retractor 104 is pivotally attached to the frame 14 of the seat 10 in a location adjacent the left side 46 of the seat and forward of the lap belt retractor 44.

FIG. 3 is an enlarged cutaway view of the buckle-lowering retractor 104. The buckle-lowering retractor 104 includes a housing 106. The housing 106 includes an outwardly extending mounting flange 108 that includes a pivot hole 110. A bolt (not shown) extends through the pivot hole 110 of the mounting flange 108 to attach the housing 106 of the buckle-lowering retractor 104 pivotally to the frame 14 of the seat 10. The housing 106 also includes opposite first and second end walls 112 and 114, respectively. The first and second end walls 112 and 114 include centrally located apertures 116 and 117 that are coaxial with one another. The housing 106 includes a cavity 118 having an opening 120 through which the buckle-lowering belt 94 extends. A guide portion 122 of the housing 106 surrounds the opening 120 for guiding the buckle-lowering belt 94 into and out of the cavity 118 of the housing 106.

The spool 102 of the buckle-lowering retractor 104 includes an axle 124 having first and second ends 126 and 128, respectively. The first end 126 of the axle 124 is received in the aperture 116 of the first end wall 112 and is rotatable relative to the first end wall. A bearing (not shown) may support the first end 126 of the axle 124 for rotation relative to the first end wall 112. The second end 128 of the axle 124 is received in the aperture 117 of the second end wall 114 and is rotatable relative to the second end wall. A bearing (not shown) may support the second end 128 of the axle 124 for rotation relative to the second end wall 114.

The spool 102 also includes a belt-receiving portion 130. The belt-receiving portion 130 is defined between first and second flanges 132 and 134, respectively, of the spool 102. The second end of the buckle-lowering belt 94 is secured to the belt-receiving portion 130 of the spool 102 and a portion of the buckle-lowering belt 94 is wound onto the belt-receiving portion 130 of the spool 102.

The buckle-lowering retractor 104 also includes a rewind spring 136. The rewind spring 136 is a spiral wound spring that includes inner and outer ends (not shown). The outer end of the rewind spring 136 is attached to the housing 106 and the inner end of the rewind spring 136 is attached to the axle 124 of the spool 102. The rewind spring 136 of the buckle-lowering retractor 104 is sufficient in strength to create a net downward force on the buckle assembly 58 when combined with the loads provided by the rewind springs of the lab belt retractor 44 and the shoulder belt retractor 80. In other words, the rewind spring 136 applies a rewind force to the spool 102 of the buckle-lowering retractor 104 that is greater than the rewind force of the rewind spring of lap belt retractor 44. The rewind spring 136 biases the spool 102 of the buckle-lowering retractor 104 into a first position relative to the housing 106 and tends to prevent rotation of the spool away from the first position. When the spool 102 is in the first position, an initial length of the buckle-lowering belt 94 extends between the buckle-lowering retractor 104 and the tongue portion 60 of the buckle assembly 58. Since the rewind spring 136 tends to prevent rotation of the spool 102 away from the first position, the initial length of the buckle-lowering belt 94 is not retracted into the housing 106 of the buckle-lowering retractor 104. When the buckle-lowering belt 94 is pulled upwardly and is withdrawn from the housing 106, the rewind spring 136 of the buckle-lowering retractor 104 is tensioned. The buckle-lowering retractor 104 allows a predetermined amount of the buckle-lowering belt 94 to be withdrawn from the housing 106 of the buckle-lowering retractor 104.

Buckle-lowering belt 96 has opposite first and second ends. The first end 140 (FIG. 1) of buckle-lowering belt 96 is attached to the buckle portion 62 of the buckle assembly 58 and a second end (not shown) of buckle-lowering belt 96 is secured to a spool of a buckle-lowering retractor 142. The buckle-lowering retractor 142 is pivotally attached to the frame 14 of the seat 10 in a location adjacent the right side 70 of the seat 10 and forward of the lap belt retractor 68. Alternatively, the buckle-lowering retractor 142 may be mounted to the floor of the vehicle 12 adjacent the right side 70 of the seat 10 and forward relative to the vehicle 12 of the lap belt retractor 68.

The buckle-lowering retractor 142 is identical to the buckle-lowering retractor 104. A rewind spring (not shown) of the buckle-lowering retractor 142 biases a spool (not shown) into a first position relative to a housing (not shown) of the buckle-lowering retractor 142. The rewind spring has a strength that is equal to the strength of the rewind spring of the buckle-lowering retractor 104 and that is greater than the strength of the rewind spring of lap belt retractor 68. When the spool of the buckle-lowering retractor 142 is in the first position, an initial length of the buckle-lowering belt 96 extends between the buckle-lowering retractor 142 and the buckle portion 62 of the buckle assembly 58. When the buckle-lowering belt 96 is pulled upwardly and is withdrawn from the housing, the rewind spring of the buckle-lowering retractor 142 is tensioned. The buckle-lowering retractor 142 allows a predetermined amount of the buckle-lowering belt 96 to be withdrawn from the housing of the buckle-lowering retractor 142.

The initial lengths of the buckle-lowering belts 94 and 96 are lengths necessary to center the buckle assembly 58 in a location adjacent to or slightly above the top of the lap of the smallest fifth percentile potential occupant of the seat 10. For example, for the driver's seat of the vehicle 12, the initial lengths of the buckle-lowering belts 94 and 96 are the lengths necessary to center the buckle assembly 58 in a location adjacent the top of the lap of a fifth percentile female occupant. In an exemplary embodiment for the driver's seat, the initial length of each of the buckle-lowering belts 94 and 96 is approximately ten inches.

The predetermined amounts of the buckle-lowering belts 94 and 96 are the additional lengths above the initial lengths that are necessary to center the buckle assembly 58 in a location adjacent to or slightly above the top of the lap of the largest ninety-fifth percentile potential occupant of the seat 10. For example, for the driver's seat, the predetermined amounts of the buckle-lowering belts 94 and 96 are the additional lengths above the initial lengths that are necessary to center the buckle assembly 58 in a location adjacent to or slightly above the top of the lap of a ninety-fifth percentile male. In an exemplary embodiment for the driver's seat, the predetermined amount of each of the buckle-lowering belts 94 and 96 that is allowed to be withdrawn from the buckle-lowering retractors 104 and 142, respectively, is approximately three inches.

The tongue portion 60 of the buckle assembly 58 of the four-point seat belt system 30 includes first and second slots 146 and 148, respectively. The first slot 146 receives the first end 42 of lap belt 32 for attaching lap belt 32 to the tongue portion 60 of the buckle assembly 58. Preferably, the first end 42 of the lap belt 32 is stitched into a loop and a portion of the loop extends through the first slot 146 for attaching the lap belt 32 to the tongue portion 60 of the buckle assembly 58. The first slot 146 receives the first end 100 of buckle-lowering belt 94 for attaching buckle-lowering belt 94 to the tongue portion 60 of the buckle assembly 58. Preferably, the first end 100 of the buckle-lowering belt 94 is stitched into a loop and a portion of the loop extends through the first slot 146 for attaching the buckle-lowering belt 94 to the tongue portion 60 of the buckle assembly 58. The second slot 148 of the tongue portion 60 receives the second end 82 of shoulder belt 36 for attaching the shoulder belt 36 to the tongue portion 60 of the buckle assembly 58. Preferably, the second end 100 of the shoulder belt 36 is stitched into a loop and a portion of the loop extends through the second slot 148 for attaching the shoulder belt 36 to the tongue portion 60 of the buckle assembly 58.

The buckle portion 62 of the buckle assembly includes first and second slots 150 and 152, respectively. The first slot 150 receives the first end 66 of lap belt 34 for attaching the lap belt 34 to the buckle portion 62 of the buckle assembly 58. Preferably, the first end 66 of the lap belt 34 is stitched into a loop and a portion of the loop extends through the first slot 150 for attaching the lap belt 34 to the buckle portion 62 of the buckle assembly 58. The first slot also receives the first end 140 of buckle-lowering belt 96 for attaching buckle-lowering belt 96 to the buckle portion 62 of the buckle assembly 58. Preferably, the first end 140 of the buckle-lowering belt 96 is stitched into a loop and a portion of the loop extends through the first slot 150 for attaching the buckle-lowering belt 96 to the buckle portion 62 of the buckle assembly 58. The second slot 152 of the buckle portion 62 receives the second end 90 of shoulder belt 38 for attaching shoulder belt 38 to the buckle portion 62 of the buckle assembly 58. Preferably, the second end 90 of the shoulder belt 38 is stitched into a loop and a portion of the loop extends through the second slot 152 for attaching the shoulder belt 38 to the buckle portion 62 of the buckle assembly 58.

The buckle portion 62 of the buckle assembly 58 receives and latches the tongue portion 60 of the buckle assembly. The buckle portion 62 includes a latch mechanism (not shown) for latching the tongue portion 60 and a release mechanism (not shown) for, when actuated, releasing or unlatching the tongue portion. When the tongue portion 60 is latched to the buckle portion 62 of the buckle assembly 58, the buckle assembly 58 interconnects the lap belts 32 and 34 and the shoulder belts 36 and 38.

When the buckle assembly 58 is unlatched, the rewind springs associated with the buckle-lowering retractors 104 and 142 act to retract their associated buckle-lowering belts 94 and 96 to a stowed position. In the illustrated embodiment, lap belt 32, shoulder belt 36, and buckle-lowering belt 94 are attached to the tongue portion 60 of the buckle assembly 58. As a result, lap belt retractor 44, shoulder belt retractor 80, and buckle-lowering retractor 104 act on the lap belt 32, shoulder belt 36, and buckle-lowering belt 94, respectively, to pull the tongue portion 60 of the buckle assembly 58 into a stowed position. The lap belt retractor 44 and the buckle-lowering retractor 104 both tend to pull the tongue portion 60 downwardly toward the cushion portion 16 of the seat 10. The shoulder belt retractor 80 tends to pull the tongue portion 60 upwardly away from the cushion portion 16 of the seat 10. Since rewind springs of each of the lap belt retractor 44 and the buckle-lowering retractor 104 are stronger than the rewind spring of the shoulder belt retractor 80, the tongue portion 60 of the buckle assembly 58 moves downwardly to a stowed position adjacent the left side 46 of the cushion portion 16 of the seat 10.

The lap belt retractor 44 tends to pull the tongue portion 60 toward the open upper end 50 of guide 48 and the buckle-lowering retractor 104 tends to pull the tongue portion 60 toward itself, i.e., toward the housing 106 of the buckle-lowering retractor 104. Since rewind spring 136 of the buckle-lowering retractor 104 is stronger than the rewind spring of the lap belt retractor 44, the tongue portion 60 of the buckle assembly 58 moves toward the buckle-lowering retractor 104 until the spool 102 of the buckle-lowering retractor 104 reaches the first position. When the spool 102 is in the first position, the initial length of the buckle-lowering belt 94 extends from the housing 106 of the buckle-lowering retractor 104. The lap belt retractor 44 then pulls the tongue portion 60 of the buckle assembly 58 to a position adjacent the open upper end 50 of guide 48. Thus, the tongue portion 60 of the buckle assembly 58 has a stowed position adjacent the open upper end 50 of guide 48. This stowed position is slightly forward of the backrest portion 18 of the seat 10 so that the second end 82 of the retracted shoulder belt 36 is spaced away from the backrest portion 20 of the seat 10. The spacing of the second end 82 of the retracted shoulder belt 36 away from the backrest portion 20 of the seat 10 improves accessibility for the occupant 22 to place a left arm under the shoulder belt 36.

Similarly, lap belt retractor 68, shoulder belt retractor 88, and buckle-lowering retractor 142 act on the lap belt 34, shoulder belt 38, and buckle-lowering belt 96, respectively, to pull the buckle portion 62 of the buckle assembly 58 into a stowed position. The buckle portion 62 of the buckle assembly 58 has a stowed position that is adjacent the open upper end of guide 72 and in a location so that the second end 90 of the retracted shoulder belt 38 is spaced away from the backrest portion 20 of the seat 10. The spacing of the second end 90 of the retracted shoulder belt 38 away from the backrest portion 20 of the seat 10 improves accessibility for the occupant 22 to place a right arm under the shoulder belt 38.

To secure the four-point seat belt system 30 about himself or herself, the seated occupant 22 first places a left arm under shoulder belt 36 and places a right arm under shoulder belt 38. The occupant 22 then grabs the tongue portion 60 and the buckle portion 62 of the buckle assembly 58 with opposite hands, moves the tongue portion and the buckle portion together, and latches the tongue portion to the buckle portion. When the tongue portion 60 and the buckle portion 62 are moved together, the forces of the rewind springs of the lap belt retractors 44 and 68 must be overcome so that lap belts 32 and 34 can be withdrawn from their respective lap belt retractors. The buckle-lowering belts 94 and 96 limit upward movement of the tongue portion 60 and the buckle portion 62, respectively, relative to the upper surface 20 of the cushion portion 16 of the seat 10 as the tongue portion and the buckle portion are moved together. As a result, the buckle-lowering belts 94 and 96 cause the buckle assembly 58 to become latched at a position adjacent the top of the lap of the occupant 22. If, due to the occupant's size, it is necessary to increase the length of the buckle-lowering belts 94 and 96 beyond the initial lengths during the latching of the buckle assembly 58, the occupant 22 pulls upwardly on the tongue portion 60 to withdraw buckle-lowering belt 94 and pulls upwardly on the buckle portion 62 to withdraw buckle-lowering belt 96.

When the occupant 22 withdraws the buckle-lowering belts 94 and 96 while buckling the four-point seat belt system 30, the spools of the buckle-lowering retractors 104 and 142 (only spool 102 of buckle-lowering retractor 104 being shown in FIG. 3) are moved away from their first positions. As a result, the rewind springs, only rewind spring 136 being shown, of the buckle-lowering retractors 104 and 142 are tensioned. When the occupant 22 latches the tongue portion 60 to the buckle portion 62 of the buckle assembly 58 and subsequently releases the tongue and buckle portions, the rewind springs of the buckle-lowering retractors 104 and 142 act to retract the buckle-lowering belts 94 and 96 toward their initial lengths, i.e., returning the spools to the first positions. Each of the buckle-lowering retractors 104 and 142 pulls its associated buckle-lowering belt 94 and 96 in a direction that creates a resultant force on the buckle assembly 58 that is generally tangential to the torso of the occupant 22, as is generally shown in FIG. 2. The retraction of the buckle-lowering belts 94 and 96 toward their initial lengths moves the buckle assembly 58 downward relative to the cushion portion 16 of the seat 10 and into a position adjacent the top of the lap of the occupant 22. Because the buckle-lower retractors 104 and 142 pull on the buckle-lowering belts 94 and 96 in a direction that is generally tangential to the torso of the occupant 22, the load normal to the direction of movement of the buckle assembly is reduced. As a result, the frictional resistance from the torso of the occupant 22 to the downward movement of the buckle assembly 58 is also reduced. Since the rewind springs of the buckle-lowering retractors 104 and 142 have identical strengths, the buckle-lowering retractors 104 and 142 provide equal retraction forces to the buckle-lowering belts 94 and 96. The equal retraction forces center the buckle assembly 58 between the left side 46 and the right side 70 of the seat 10 and along a centerline C (FIG. 1) of the seated occupant 22.

While the occupant 22 is wearing the four-point seat belt system 30, the buckle-lowering belts 94 and 96 help to maintain the position of the buckle assembly 58 adjacent the top of the lap of the occupant 22 and prevent "ride up" of the buckle assembly 58 away from the top of the lap of the occupant 22. When the buckle assembly 58 is latched and only the initial lengths of the buckle-lowering belts 94 and 96 are withdrawn from the buckle-lowering retractors 104 and 142, the rewind springs tend to maintain the spools of the buckle-lowering retractors 104 and 142 in their first positions. Consequently, withdrawal of the buckle-lowering belts 94 and 96 and upward movement of the buckle assembly 58 relative to the seat 10 is resisted. When the buckle assembly 58 is latched and more than the initial lengths of the buckle-lowering belts 94 and 96 are withdrawn from the buckle-lowering retractors 104 and 142, the rewind springs tend to bias the spools of the buckle-lowering retractors 104 and 142 toward their first positions. This bias results in the buckle-lowering belts 94 and 96 pulling downwardly on the buckle assembly 58 to maintain the buckle assembly in the position adjacent the top of the occupant's lap.

In the event of a crash condition, the locking mechanisms of the lap belt retractors 44 and 68 and the shoulder belt retractors 80 and 88 engage and the lap belts 32 and 34 and the shoulder belts 36 and 38 act to restrain the occupant 22 in the seat 10. Other than positioning the buckle assembly 58 relative to the occupant 22, the buckle-lowering retractors 104 and 142 and the buckle-lowering belts 94 and 96 play little part in restraining the occupant 22 relative to the seat 10 in the event of a crash condition. Thus, the buckle-lowering retractors 104 and 142 may be referred to as "non-structural" since the buckle-lowering retractors do not bear loads during occupant 22 restraint in the event of a crash condition. Since the buckle-lowering retractors 104 and 142 are non-structural, the buckle-lowering retractors 104 and 142 may be made of lower strength materials than typical structural retractors, which bear loads during restraint of the occupant 22 in the event of a crash condition. A further benefit of the buckle-lowering retractors 104 and 142 being non-structural is that the buckle-lowering retractors do not have locking mechanisms.

FIG. 4 is an enlarged cutaway view of an alternative buckle-lowering retractor 160 for the four-point seat belt system 30 of FIG. 1. The buckle-lowering retractor 160 illustrated in FIG. 4 includes a housing 162. The housing 162 includes an outwardly extending mounting flange 164 that includes a pivot hole 166. The pivot hole 166 of the mounting flange 164 is adapted to receive a bolt (not shown) for pivotally attaching the housing 162 of the buckle-lowering retractor 160 to the frame 14 of the seat 10. The housing 162 also includes opposite first and second end walls 168 and 170, respectively. The first end wall 168 includes a centrally located aperture 172. The housing 162 includes a cavity 174 having an opening 176 through which the buckle-lowering belt 94 extends. A guide portion 178 of the housing 162 surrounds the opening 176 for guiding the buckle-lowering belt 94 into and out of the cavity 174 of the housing.

A spool 180 is located within the cavity 174 of the housing 162. The spool 180 includes an axle 182 having a first end 184 and a second end (not shown). The first end 184 of the axle 182 is received in the aperture 172 of the first end wall 168 and is rotatable relative to the first end wall. A bearing (not shown) may be used to support the first end 184 of the axle 182 for rotation relative to the first end wall 168. The second end of the axle 182 is connected to an electric motor 186. A gear assembly (not shown) may connect the second end of the axle 182 to the electric motor 186. The spool 180 also includes a belt-receiving portion 188. The belt-receiving portion 188 is defined between first and second flanges 190 and 192, respectively of the spool 180. The second end of the buckle-lowering belt 94 is secured to the belt-receiving portion 188 of the spool 180 and a portion of the buckle-lowering belt 94 is wound onto the spool 180.

The buckle-lowering retractor 160 also includes a rewind spring 194. The rewind spring 194 is a spiral wound spring that includes inner and outer ends (not shown). The outer end of the rewind spring 194 is attached to the housing 162 and the inner end of the rewind spring 194 is attached to the axle 182 of the spool 180. The rewind spring 194 of the buckle-lowering retractor 160 has a strength that is much less than the strength of the rewind spring of lap belt retractor 44. In other words, the rewind spring 194 applies a rewind force to the spool 180 of the buckle-lowering retractor 160 that is much less than the rewind force of the rewind spring of lap belt retractor 44. The rewind spring 194 biases the spool 180 into a first position relative to the housing 162. When the spool 180 is in the first position, an initial length of the buckle-lowering belt 94 extends between the buckle-lowering retractor 160 and the tongue portion 60 of the buckle assembly 58. When the buckle-lowering belt 94 is pulled upwardly, as shown in FIG. 4, and is withdrawn from the housing 162, the rewind spring 194 is tensioned. The buckle-lowering retractor 160 allows a predetermined amount of the buckle-lowering belt 94 to be withdrawn from the housing 162 of the buckle-lowering retractor 160.

The electric motor 186 is actuatable for rotating the spool 180 in a direction for retracting the buckle-lowering belt 94 into the housing 162. The electric motor 186 receives power from an external power source 196, such as the vehicle battery. A controller 198 is operatively connected to the electric motor 186 and controls actuation of the electric motor. The controller 198 is responsive to signals from a tension sensor 200, a buckle switch 202, and, optionally, a belt position sensor 204.

The tension sensor 200 senses tension in the buckle-lowering belt 94 and provides to the controller 198 a signal indicative of the sensed tension. Alternatively, the tension sensor 200 may sense the amperage of the electric motor 186 and output a signal indicative of the amperage. Given parameters of the electric motor 186, the amperage of the electric motor 186 may be correlated into a belt tension either in the tension sensor 200 or in the controller 198.

The buckle switch 202 monitors the latched condition of the buckle assembly 58 and provides an electronic signal to the controller 198 indicating the latched condition. For example, the buckle switch 202 may provide a five volt signal to the controller 198 when the tongue portion 60 and the buckle portion 62 of the buckle assembly 58 are latched together. The buckle switch 202 may provide a zero volt signal when the tongue portion 60 and the buckle portion 62 of the buckle assembly 58 are unlatched.

The position sensor 204 monitors the position of the buckle-lowering belt 94 and provides a signal to the controller 198 indicating the position of the buckle-lowering belt. The position sensor 204 preferably includes a Hall effect device and a magnet 206 that is attached to the buckle-lowering belt 94. When the magnet 94 is positioned adjacent the Hall effect device, indicated generally at 204, a first signal is provided to the controller 198. When the magnet 206 is not positioned adjacent the Hall effect device 204, a second signal, different from the first signal, is provided to the controller 198.

When the buckle assembly 58 is unlatched and the tongue and buckle portions 60 and 62 are in their stowed positions, the spool 180 of the buckle-lowering retractor 160 is in the first position. When the four-point seat belt system 30 is placed on the occupant 22, the buckle-lowering belt 94 may be withdrawn from the housing 162 of the buckle-lowering retractor 160. The rewind spring 194 is tensioned when the buckle-lowering belt 94 is withdrawn. Additionally, if the position sensor 204 is used, a signal may be sent to the controller 198 indicating that the buckle-lowering belt 94 has been withdrawn from the housing 162. The signal from the position sensor 204 may be used to wake the controller 198 from a lower power consumption sleep mode so that the controller begins monitoring signals from the buckle switch 202.

When the controller 198 receives a signal from the buckle switch 202 indicating that the buckle assembly 58 is latched, the controller 198 actuates the electric motor 186 to rotate the spool 180 in a direction for retracting the buckle-lowering belt 94. When the optional position sensor 204 is not present, the buckle-lowering belt 94 is retracted until the controller 198 determines that a predefined belt tension has been reached. The predefined belt tension is reached when the buckle assembly 58 is located adjacent the top of the occupant's lap and the occupant's lap resists further lowering of the buckle assembly 58. The predefined belt tension is sufficiently high so as to overcome any frictional resistance to movement of the buckle assembly 58. When the controller 198 determines that the predefined belt tension has been reached, the controller 198 stops the electric motor 186.

When the optional position sensor 204 is present, the buckle-lowering belt 94 is retracted until the controller 198 determines that either (a) the buckle-lowering belt 94 has returned to its initial position relative to the housing 162, i.e., magnet 206 is positioned adjacent Hall effect device 204, or (b) the predefined belt tension has been reached. When the controller 198 determines that either (a) the buckle-lowering belt 94 has returned to its initial position relative to the housing 162, or (b) the predefined belt tension has been reached, the controller 198 stops the electric motor 186. When the electric motor 186 is stopped, the rewind spring 194 maintains the position of the buckle assembly 58 relative to the occupant's lap. Although the rewind spring 194 is significantly weaker that the rewind spring of lap belt retractor 44, the force of rewind spring 194 is sufficient to prevent the buckle assembly 58 from moving upwardly away from the top of the occupant's lap.

When the buckle assembly 58 is unlatched, the rewind spring 194 rotates the spool 180 toward the first position for retracting the buckle-lowering belt 94 to its initial position relative to the housing 162. Alternatively, the controller 198 may be responsive to the signal from the buckle switch 202 for actuating the electric motor 186 to rotate the spool 180 in the retraction direction for retracting the buckle-lowering belt 94 to its initial position.

The electric motor driven buckle-lowering retractor 160 of FIG. 4 provides several advantages over the buckle-lowering retractor 104 of FIG. 3. First, the electric motor 186 enables a larger force to be applied to the buckle-lowering belt 94 to ensure that the buckle assembly 58 is lowered to the position adjacent the top of the lap of the occupant 22. Movement of the buckle assembly 58 may be hindered, for example, by the clothing of the occupant 22. The ability to apply a large force to the buckle-lowering belt 94 helps to overcome such obstacles to positioning the buckle assembly 58 adjacent the top of the lap of the occupant 22. Furthermore, the use of the electric motor 186 for lowering the buckle assembly 58 enables the use of a much weaker rewind spring 194 in the buckle-lowering retractor 160 of FIG. 4 as compared to the rewind spring 136 of the buckle-lowering retractor 104 of FIG. 3. The weaker rewind spring 194 decreases the force applied to the occupant 22 when more than the initial length of the buckle-lowering belt 94 extends from the buckle-lowering retractor 160. Decreasing the force applied to the occupant 22 helps to increase the occupant's comfort.

FIG. 5 illustrates a four-point seat belt system 30' constructed in accordance with a second embodiment of the present invention. Structures of FIG. 5 that are similar to or identical to structures of FIG. 1 are indicated using the same reference number as used in FIG. 1.

The four-point seat belt system 30' of FIG. 5 is similar to the four-point seat belt system 30 of FIG. 1 with the exception that the four-point seat belt system 30' includes a single buckle-lowering retractor 220 for both buckle-lowering belts 94 and 96. The four-point seat belt system 30' also and includes first and second D-rings 222 and 224 (FIG. 5) for guiding the buckle-lowering belts 94 and 96 to the buckle-lowering retractor 220. The first and second D-rings 220 and 224 are attached to the frame 14 of the seat 10. The first D-ring 222 extends outwardly of the left side 46 of the seat 10 and the second D-ring 224 extends outwardly of the right side 70 of the seat. The first D-ring 222 guides buckle-lowering belt 94 between a vertically extending portion 226 and a horizontally extending portion 228. The vertically extending portion 226 extends from the D-ring 222 to the tongue portion 60 of the buckle assembly 58 and the horizontally extending portion 228 extends from the D-ring 222 to the buckle-lowering retractor 220. Similarly, the second D-ring 224 guides buckle-lowering belt 96 between a vertically extending portion 230 and a horizontally extending portion 232. The vertically extending portion 230 extends from the D-ring 224 to the buckle portion 62 of the buckle assembly 58 and the horizontally extending portion 232 extends from the D-ring 224 to the buckle-lowering retractor 220.

FIG. 6 is an enlarged cutaway view of the buckle-lowering retractor 220 for the four-point seat belt system 30' of FIG. 5. The buckle-lowering retractor 220 includes a housing 236. The housing 236 is mounted to the frame 14 of the seat 10 within the cushion portion 16 of the seat. Alternatively, the housing 236 may be located under the cushion portion 16 of the seat 10. The housing 236 includes a central cavity 238 that is partially defined between opposite first and second end walls 240 and 242, respectively, and opposite left and right side walls 244 and 246, respectively. The first and second end walls 240 and 242 include centrally located apertures 248 and 250, respectively, that are coaxial with one another. The left side wall 244 has an opening 252 through which the buckle-lowering belt 94 extends and the right side wall 246 has an opening 254 through which the buckle-lowering belt 96 extends. The opening 254 in the right side wall 246 is nearer the first end wall 240 of the housing 236 than the opening 252 in the left side wall 244. The housing 236 also includes first and second guide portions 256 and 258, respectively. The first guide portion 256 surrounds the opening 252 in the left side wall 244 for guiding the buckle-lowering belt 94 into and out of the cavity 238 of the housing 236. The second guide portion 258 surrounds the opening 254 in the right side wall 246 for guiding the buckle-lowering belt 96 into and out of the cavity 238 of the housing 236.

A spool 260 of the buckle-lowering retractor 220 is located in the cavity 238 of the housing 236. The spool 260 includes an axle 262 having first and second ends 264 and 266, respectively. The first end 264 of the axle 262 is received in the aperture 248 of the first end wall 240 and is rotatable relative to the first end wall. A bearing (not shown) may support the first end 264 of the axle 262 for rotation relative to the first end wall 240. The second end 266 of the axle 262 is received in the aperture 250 of the second end wall 242 and is rotatable relative to the second end wall. A bearing (not shown) may support the second end 266 of the axle 262 for rotation relative to the second end wall 242.

The spool 260 also includes first and second belt-receiving portions 268 and 270, respectively. The first belt-receiving portion 268 is defined between first and second flanges 272 and 274, respectively, of the spool 260. The second belt-receiving portion 270 is defined between the second flange 274 and a third flange 276 of the spool 260. The second end of buckle-lowering belt 96 is secured to the first belt-receiving portion 268 of the spool 260 and a portion of the buckle-lowering belt 96 is wound onto the spool 260. The second end of buckle-lowering belt 94 is secured to the second belt-receiving portion 270 of the spool 260 and a portion of the buckle-lowering belt 94 is wound onto the spool 260. Rotation of the spool 260 in a first direction (counterclockwise in FIG. 5) retracts both buckle-lowering belts 94 and 96. Rotation of the spool 260 in a second direction, opposite the first direction (clockwise in FIG. 5), enables withdrawal of both buckle-lowering belts 94 and 96.

The buckle-lowering retractor 220 also includes a rewind spring 278. The rewind spring 278 is a spiral wound spring that includes inner and outer ends (not shown). The outer end of the rewind spring 278 is attached to the housing 236 and the inner end of the rewind spring 278 is attached to the axle 262 of the spool 260. The rewind spring 278 of the buckle-lowering retractor 220 has a strength that is greater than the combined strength of the rewind springs of lap belt retractors 44 and 68. In other words, the rewind spring 278 applies a rewind force to the spool 260 of the buckle-lowering retractor 220 that is greater than the combined rewind forces of the rewind springs of lap belt retractors 44 and 68. The rewind spring 278 biases the spool 260 into a first position relative to the housing 236. When the spool 260 is in the first position, an initial length of the buckle-lowering belt 94 extends between the buckle-lowering retractor 220 and the tongue portion 60 of the buckle assembly 58. Similarly, an initial length of the buckle-lowering belt 96 extends between the buckle-lowering retractor 220 and the buckle portion 62 of the assembly 58. When either of the buckle-lowering belts 94 or 96 is pulled upwardly, the spool 260 is rotated and both buckle-lowering belts 94 and 96 are withdrawn from the housing 236. The buckle-lowering retractor 220 allows a predetermined amount of each of the buckle-lowering belts 94 and 96 to be withdrawn from the housing 236 of the buckle-lowering retractor 220.

The buckle-lowering retractor 220 operates to position the buckle assembly 58 adjacent the top of the lap of the occupant 22 of the seat 10. If the occupant 22 withdraws the buckle-lowering belts 94 and 96 while latching the four-point seat belt system 30', the spool 260 of the buckle-lowering retractor 220 is rotated away from the first position. As a result, the rewind spring 278 of the buckle-lowering retractor 220 is tensioned. When the occupant 22 latches the tongue portion 60 to the buckle portion 62 of the buckle assembly 58 and subsequently releases the tongue and buckle portions, the rewind spring 278 acts to rotate the spool 260 toward the first position and retracts the buckle-lowering belts 94 and 96. The buckle-lowering retractor 220 pulls the buckle-lowering belts 94 and 96 in a direction that is generally tangential to the torso of the occupant 22 so as to move the buckle assembly 58 downward relative to the cushion portion 16 of the seat 10 and into a position adjacent the top of the lap of the occupant 22. The retraction of the buckle-lowering belts 94 and 96 centers the buckle assembly 58 between the left side 46 and the right side 70 of the seat 10 and along a centerline C (FIG. 5) of the seated occupant 22.

While the occupant 22 is wearing the four-point seat belt system 30', the buckle-lowering belts 94 and 96 help to maintain the position of the buckle assembly 58 adjacent the top of the lap of the occupant 22 and prevent "ride up" of the buckle assembly 58 away from the top of the lap of the occupant 22. When the buckle assembly 58 is latched and only the initial lengths of the buckle-lowering belts 94 and 96 are withdrawn from the buckle-lowering retractor 220, the rewind spring 278 tends to maintain the spool 260 of the buckle-lowering retractor 220 in the first position. Consequently, withdrawal of the buckle-lowering belts 94 and 96 and upward movement of the buckle assembly 58 is resisted. When the buckle assembly 58 is latched and more than the initial lengths of the buckle-lowering belts 94 and 96 are withdrawn from the buckle-lowering retractor 220, the rewind spring 278 tends to bias the spool 260 of the buckle-lowering retractor 220 toward the first position. This bias results in the buckle-lowering belts 94 and 96 pulling downwardly on the buckle assembly 58 to maintain the buckle assembly in position adjacent the top of the occupant's lap.

Similar to the buckle-lowering retractors 104 and 142 of FIG. 1, the buckle-lowering retractor 220 in the four-point seat belt system 30' of FIG. 5 may be referred to as "non-structural" since the buckle-lowering retractor 220 plays little part in the restraint of the occupant 22 in the event of a crash condition. Since the buckle-lowering retractor 220 is non-structural, the buckle-lowering retractor 220 may be made of lower strength materials than typical structural retractors, which bear loads during restraint of the occupant 22 in the event of a crash condition. A further benefit of the buckle-lowering retractor 220 being non-structural is that the buckle-lowering retractor 220 does not have a locking mechanism for locking rotation of the spool 260.

FIG. 7 is an enlarged cutaway view of an alternative buckle-lowering retractor 300 for the four-point seat belt system 30' of FIG. 5. The buckle-lowering retractor 300 illustrated in FIG. 7 includes a housing 302. The housing 302 is mounted to the frame 14 of the seat 10 within the cushion portion 16 of the seat. The housing 302 includes a central cavity 304 that is partially defined between opposite first and second end walls 306 and 308, respectively, and opposite left and right side walls 310 and 312, respectively. The first end wall 306 includes a centrally located aperture 314. The left side wall 310 has an opening 316 through which the buckle-lowering belt 94 extends and the right side wall 312 has an opening 318 through which the buckle-lowering belt 96 extends. The opening 318 in the right side wall 312 is nearer the first end wall 306 of the housing 302 than the opening 316 in the left side wall 310. The housing 302 also includes first and second guide portions 320 and 322, respectively. The first guide portion 320 surrounds the opening 316 in the left side wall 310 for guiding the buckle-lowering belt 94 into and out of the cavity 304 of the housing 302. The second guide portion 322 surrounds the opening 318 in the right side wall 312 for guiding the buckle-lowering belt 96 into and out of the cavity 304 of the housing 302.

A spool 324 of the buckle-lowering retractor 300 is located in the cavity 304 of the housing 302. The spool 324 includes an axle 326 having a first end 328 and a second end (not shown). The first end 328 of the axle 326 is received in the aperture 314 of the first end wall 306 and is rotatable relative to the first end wall 306. A bearing (not shown) may support the first end 328 of the axle 326 for rotation relative to the first end wall 306. A second end of the axle 326 is connected to an electric motor 330. A gear assembly (not shown) may be used to connect the second end of the axle 326 to the electric motor 330.

The spool 324 also includes first and second belt-receiving portions 332 and 334, respectively. The first belt-receiving portion 332 is defined between first and second flanges 336 and 338, respectively, of the spool 324. The second belt-receiving portion 334 is defined between the second flange 338 and a third flange 339 of the spool 324. The second end of buckle-lowering belt 96 is secured to the first belt-receiving portion 332 of the spool 324 and a portion of the buckle-lowering belt 96 is wound onto the spool 324. The second end of buckle-lowering belt 94 is secured to the second belt-receiving portion 334 of the spool 324 and a portion of the buckle-lowering belt 94 is wound onto the spool 324. Rotation of the spool 324 in a first direction (counterclockwise in FIG. 5) retracts both buckle-lowering belts 94 and 96. Rotation of the spool 324 in a second direction, opposite the first direction (clockwise in FIG. 5), enables withdrawal of both buckle-lowering belts 94 and 96.

The buckle-lowering retractor 300 also includes a rewind spring 340. The rewind spring 340 is a spiral wound spring that includes inner and outer ends (not shown). The outer end of the rewind spring 340 is attached to the housing 302 and the inner end of the rewind spring 340 is attached to the axle 326 of the spool 324. The rewind spring 340 of the buckle-lowering retractor 300 has a strength that is much less than the combined strength of the rewind springs of lap belt retractors 44 and 68. In other words, the rewind spring 340 applies a rewind force to the spool 324 of the buckle-lowering retractor 300 that is much less than the combined rewind force of the rewind springs of lap belt retractors 44 and 68. The rewind spring 340 biases the spool 324 into a first position relative to the housing 302. When the spool 324 is in the first position, an initial length of the buckle-lowering belt 94 extends between the buckle-lowering retractor 300 and the tongue portion 60 of the buckle assembly 58. Similarly, an initial length of the buckle-lowering belt 96 extends between the buckle-lowering retractor 300 and the buckle portion 62 of the buckle assembly 58. When either of the buckle-lowering belts 94 or 96 is pulled upwardly, the spool 324 is rotated and both buckle-lowering belts 94 and 96 are withdrawn from the housing 302. The buckle-lowering retractor 300 allows a predetermined amount of each of the buckle-lowering belts 94 and 96 to be withdrawn from the housing 302 of the buckle-lowering retractor 300.

The electric motor 330 of the buckle-lowering retractor 300 is actuatable for rotating the spool 324 in a direction for retracting the buckle-lowering belts 94 and 96 into the housing 302. The electric motor 330 receives power from an external power source 342, such as the vehicle battery. A controller 344 is operatively connected to the electric motor 330 and controls actuation of the electric motor 330. The controller 344 is responsive to signals from a tension sensor 346, a buckle switch 348, and, optionally, a belt position sensor 350.

The tension sensor 346 senses tension in one or both of the buckle-lowering belts 94 and 96 and provides to the controller 344 signals indicative of the sensed tension. Alternatively, the tension sensor 346 may sense the amperage of the electric motor 330 and output signals indicative of the amperage. Given parameters of the electric motor 330, the amperage of the electric motor 330 may be correlated into a belt tension either in the tension sensor 346 or in the controller 344.

The buckle switch 348 monitors the latched condition of the buckle assembly 58 and provides to the controller 344 an electronic signal indicating the latched condition of the buckle assembly 58. For example, the buckle switch 348 may provide a five volt signal to the controller 344 when the tongue portion 60 and the buckle portion 62 of the buckle assembly 58 are latched together. The buckle switch 348 may provide a zero volt signal when the tongue portion 60 and the buckle portion 62 of the buckle assembly 58 are unlatched.

The position sensor 350 monitors the position of one of the buckle-lowering belt 94 and 96 and provides a signal to the controller 344 indicating the position of the buckle-lowering belt 94 or 96. The position sensor 350 preferably includes a Hall effect device, indicated generally at 350, and a magnet 352 that is attached to the buckle-lowering belt 96. When the magnet 352 is positioned adjacent the Hall effect device 350, as is shown in FIG. 7, a first signal is provided to the controller 344. When the magnet 352 is not positioned adjacent the Hall effect device 350, a second signal, different from the first signal, is provided to the controller 344.

When the four-point seat belt system 30' is placed on the occupant 22, the buckle-lowering belts 94 and 96 may be withdrawn from the housing 302 of the buckle-lowering retractor 300. The rewind spring 340 is tensioned when the buckle-lowering belts 94 and 96 are withdrawn from the housing 302. If the position sensor 350 is used, a signal may be sent to the controller 344 indicating that the buckle-lowering belts 94 and 96 have been withdrawn. The signal from the position sensor 350 may be used to wake the controller 344 from a lower power consumption sleep mode so that the controller 344 begins monitoring signals from the buckle switch 348.

When the controller 344 receives a signal from the buckle switch 348 indicating that the buckle assembly 58 is latched, the controller 344 actuates the electric motor 330 to rotate the spool 324 in a direction for retracting the buckle-lowering belts 94 and 96. When the optional position sensor 350 is not present, the buckle-lowering belts 94 and 96 are retracted until the controller 344 determines that the predefined belt tension has been reached. The predefined belt tension is reached when the buckle assembly 58 is located adjacent the top of the occupant's lap and the occupant's lap resists further lowering of the buckle assembly 58. The predefined belt tension is sufficiently high so as to overcome any frictional resistance to movement of the buckle assembly 58. When the controller 344 determines that the predefined belt tension has been reached, the controller 344 stops the electric motor 330.

When the optional position sensor 350 is present, the buckle-lowering belts 94 and 96 are retracted until the controller 344 determines that either (a) the buckle-lowering belts 94 and 96 have returned to their the initial positions relative to the housing 302, i.e., magnet 352 is positioned adjacent Hall effect device 350, or (b) the predefined belt tension has been reached. When the controller 344 determines that either (a) the buckle-lowering belts 94 and 96 have returned to their initial position relative to the housing 302, or (b) the predefined belt tension has been reached, the controller 344 stops the electric motor 330. When the electric motor 330 is stopped, the rewind spring 340 maintains the position of the buckle assembly 58 relative to the occupant's lap. Although the rewind spring 340 is significantly weaker that the combined strengths of the rewind springs of lap belt retractors 44 and 68, the force of rewind spring 340 is sufficient to prevent the buckle assembly 58 from moving upwardly away from the top of the occupant's lap.

When the buckle assembly 58 is unbuckled, the rewind spring 340 rotates the spool 324 toward the first position for retracting the buckle-lowering belts 94 and 96 to their initial positions relative to the housing 302. Alternatively, the controller 344 may be responsive the signal from the buckle switch 348 for actuating the electric motor 330 to rotate the spool 324 in the retraction direction for retracting the buckle-lowering belts 94 and 96 to their initial positions.

A second alternative buckle-lowering retractor for the four-point seat belt system 30' of FIG. 5 includes a housing. The housing is mounted to the frame 14 of the seat 10 within the cushion portion 16 of the seat. Alternatively, the housing may be located under the cushion portion 16 of the seat 10. The housing includes a central cavity that is partially defined between opposite first and second end walls and opposite left and right side walls. The first and second end walls include centrally located apertures that are coaxial with one another. The left side wall has an opening through which the buckle-lowering belt 94 extends and the right side wall has an opening through which the buckle-lowering belt 96 extends. The opening in the right side wall is aligned with the opening in the left side wall. The housing also includes first and second guide portions. The first guide portion surrounds the opening in the left side wall for guiding the buckle-lowering belt 94 into and out of the cavity of the housing. The second guide portion surrounds the opening in the right side wall for guiding the buckle-lowering belt 96 into and out of the cavity of the housing.

A spool of the second alternative buckle-lowering retractor is located in the cavity of the housing. The spool includes an axle having first and second ends. The first end of the axle is received in the aperture of the first end wall and is rotatable relative to the first end wall. A bearing may support the first end of the axle for rotation relative to the first end wall. The second end of the axle is received in the aperture of the second end wall and is rotatable relative to the second end wall. A bearing may support the second end of the axle for rotation relative to the second end wall.

The spool also includes a belt-receiving portion. The belt-receiving portion is defined between first and second flanges of the spool. The second end of buckle-lowering belt 94 and the second end of the buckle-lowering belt 96 are secured to the belt-receiving portion of the spool and portions of the buckle-lowering belts 94 and 96 are wound onto the spool. Rotation of the spool in a first direction retracts both buckle-lowering belts 94 and 96. Rotation of the spool in a second direction, opposite the first direction enables withdrawal of both buckle-lowering belts 94 and 96.

The second alternative buckle-lowering retractor also includes a rewind spring. The rewind spring is a spiral wound spring that includes inner and outer ends. The outer end of the rewind spring is attached to the housing and the inner end of the rewind spring is attached to the axle of the spool. The rewind spring of the second alterntive buckle-lowering retractor has a strength that is greater than the combined strength of the rewind springs of lap belt retractors 44 and 68. In other words, the rewind spring applies a rewind force to the spool of the second alternative buckle-lowering retractor that is greater than the combined rewind forces of the rewind springs of lap belt retractors 44 and 68. The rewind spring biases the spool into a first position relative to the housing. When the spool is in the first position, an initial length of the buckle-lowering belt 94 extends between the second alternative buckle-lowering retractor and the tongue portion 60 of the buckle assembly 58. Similarly, an initial length of the buckle-lowering belt 96 extends between the buckle-lowering retractor and the buckle portion 62 of the assembly 58. When either of the buckle-lowering belts 94 or 96 is pulled upwardly, the spool is rotated and both buckle-lowering belts 94 and 96 are withdrawn from the housing. The second alternative buckle-lowering retractor allows a predetermined amount of each of the buckle-lowering belts 94 and 96 to be withdrawn from the housing of the buckle-lowering retractor.

The second alternative buckle-lowering retractor operates to position the buckle assembly 58 adjacent the top of the lap of the occupant 22 of the seat 10. If the occupant 22 withdraws the buckle-lowering belts 94 and 96 while latching the four-point seat belt system 30', the spool of the buckle-lowering retractor is rotated away from the first position. As a result, the rewind spring of the buckle-lowering retractor is tensioned. When the occupant 22 latches the tongue portion 60 to the buckle portion 62 of the buckle assembly 58 and subsequently releases the tongue and buckle portions, the rewind spring acts to rotate the spool toward the first position and retracts the buckle-lowering belts 94 and 96. The second alternative buckle-lowering retractor pulls the buckle-lowering belts 94 and 96 in a direction that is generally tangential to the torso of the occupant 22 so as to move the buckle assembly 58 downward relative to the cushion portion 16 of the seat 10 and into a position adjacent the top of the lap of the occupant 22. The retraction of the buckle-lowering belts 94 and 96 centers the buckle assembly 58 between the left side 46 and the right side 70 of the seat 10 and along a centerline C (FIG. 5) of the seated occupant 22.

While the occupant 22 is wearing the four-point seat belt system 30', the buckle-lowering belts 94 and 96 help to maintain the position of the buckle assembly 58 adjacent the top of the lap of the occupant 22 and prevent "ride up" of the buckle assembly 58 away from the top of the lap of the occupant 22. When the buckle assembly 58 is latched and only the initial lengths of the buckle-lowering belts 94 and 96 are withdrawn from the second alternaive buckle-lowering retractor the rewind spring tends to maintain the spool of the buckle-lowering retractor in the first position. Consequently, withdrawal of the buckle-lowering belts 94 and 96 and upward movement of the buckle assembly 58 is resisted. When the buckle assembly 58 is latched and more than the initial lengths of the buckle-lowering belts 94 and 96 are withdrawn from the buckle-lowering retractor 220', the rewind spring 278' tends to bias the spool 260' of the buckle-lowering retractor 220' toward the first position. This bias results in the buckle-lowering belts 94 and 96 pulling downwardly on the buckle assembly 58 to maintain the buckle assembly in position adjacent the top of the occupant's lap.

Similar to the buckle-lowering retractors 104 and 142 of FIG. 1, the buckle-lowering retractor 220' in the four-point seat belt system 30' of FIG. 5 may be referred to as "non-structural" since the buckle-lowering retractor 220' plays little part in the restraint of the occupant 22 in the event of a crash condition. Since the buckle-lowering retractor 220' is non-structural, the buckle-lowering retractor 220' may be made of lower strength materials than typical structural retractors, which bear loads during restraint of the occupant 22 in the event of a crash condition. A further benefit of the buckle-lowering retractor 220' being non-structural is that the buckle-lowering retractor 220' does not have a locking mechanism for locking rotation of the spool 260'.

Figure 9:
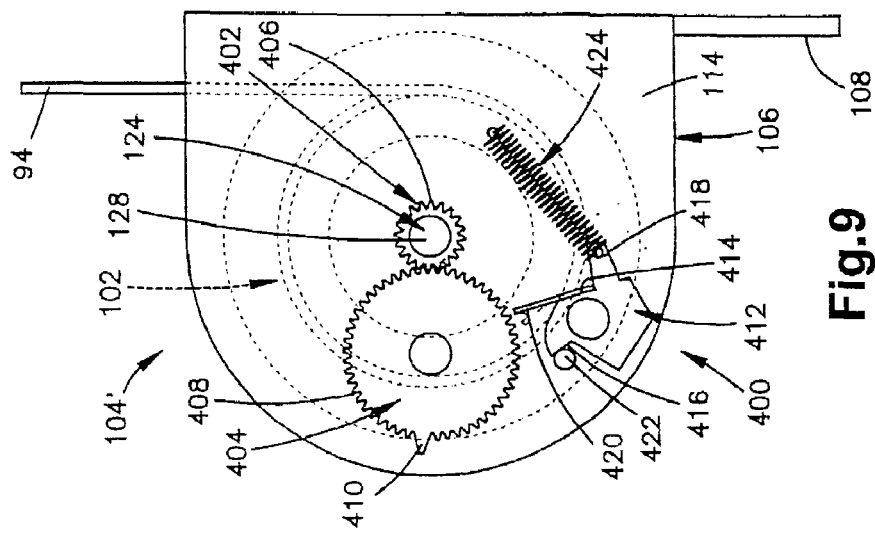
FIG. 9 illustrates the buckle-lowering retractor of FIG. 8 with the mechanism in a condition in which the additional length of the buckle-lowering belt is withdrawn from the buckle-lowering retractor.

FIG. 9 is an enlarged cutaway view of an alternative buckle-lowering retractor 300' for the four-point seat belt system 30' of FIG. 5. Structures of FIG. 9 that are the same or similar to structures of FIG. 7 are labeled with the same reference number with the addition of a prime. The buckle-lowering retractor 300' illustrated in FIG. 9 includes a housing 302'. The housing 302' is mounted to the frame 14 of the seat 10 within the cushion portion 16 of the seat. The housing 302' includes a central cavity 304' that is partially defined between opposite first and second end walls 306' and 308', respectively, and opposite left and right side walls 310' and 312', respectively. The first end wall 306' includes a centrally located aperture 314'. The left side wall 310' has an opening 316' through which the buckle-lowering belt 94 extends and the right side wall 312' has an opening 318' through which the buckle-lowering belt 96 extends. The opening 318' in the right side wall 312' is aligned with the opening 316' in the left side wall 310'. The housing 302' also includes first and second guide portions 320' and 322', respectively. The first guide portion 320' surrounds the opening 316' in the left side wall 310' for guiding the buckle-lowering belt 94 into and out of the cavity 304' of the housing 302'. The second guide portion 322' surrounds the opening 318' in the right side wall 312' for guiding the buckle-lowering belt 96 into and out of the cavity 304' of the housing 302'.

A spool 324' of the buckle-lowering retractor 300' is located in the cavity 304' of the housing 302'. The spool 324' includes an axle 326' having a first end 328' and a second end (not shown). The first end 328' of the axle 326' is received in the aperture 314' of the first end wall 306' and is rotatable relative to the first end wall. A bearing (not shown) may support the first end 328' of the axle 326' for rotation relative to the first end wall 306'. A second end of the axle 326' is connected to an electric motor 330'. A gear assembly (not shown) may be used to connect the second end of the axle 326' to the electric motor 330'.

The spool 324' also includes a belt-receiving portion 332'. The belt-receiving portion 332' is defined between first and second flanges 336' and 338', respectively, of the spool 324'. The second end of buckle-lowering belt 94 and the second end of buckle-lowering belt 96 are secured to the belt-receiving portion 332' of the spool 324' and portions of the buckle-lowering belts 94 and 96 are wound onto the spool 324'. Rotation of the spool 324' in a first direction (counterclockwise as viewed from the first end wall 306' in FIG. 9) retracts both buckle-lowering belts 94 and 96. Rotation of the spool 324' in a second direction, opposite the first direction (clockwise as viewed from the first end wall 306' in FIG. 9), enables withdrawal of both buckle-lowering belts 94 and 96.

The buckle-lowering retractor 300' also includes a rewind spring 340'. The rewind spring 340' is a spiral wound spring that includes inner and outer ends (not shown). The outer end of the rewind spring 340' is attached to the housing 302' and the inner end of the rewind spring 340' is attached to the axle 326' of the spool 324'. The rewind spring 340' of the buckle-lowering retractor 300' has a strength that is much less than the combined strength of the rewind springs of lap belt retractors 44 and 68. In other words, the rewind spring 340' applies a rewind force to the spool 324' of the buckle-lowering retractor 300' that is much less than the combined rewind force of the rewind springs of lap belt retractors 44 and 68. The rewind spring 340' biases the spool 324' into a first position relative to the housing 300'. When the spool 324' is in the first position, an initial length of the buckle-lowering belt 94 extends between the buckle-lowering retractor 300' and the tongue portion 60 of the buckle assembly 58. Similarly, an initial length of the buckle-lowering belt 96 extends between the buckle-lowering retractor 300' and the buckle portion 62 of the buckle assembly 58. When either of the buckle-lowering belts 94 or 96 is pulled upwardly, the spool 324' is rotated and both buckle-lowering belts 94 and 96 are withdrawn from the housing 302'. The buckle-lowering retractor 300' allows a predetermined amount of each of the buckle-lowering belts 94 and 96 to be withdrawn from the housing 302' of the buckle-lowering retractor 300'.

The electric motor 330' of the buckle-lowering retractor 300' is actuatable for rotating the spool 324' in a direction for retracting the buckle-lowering belts 94 and 96 into the housing 302'. The electric motor 330' receives power from an external power source 342', such as the vehicle battery. A controller 344' is operatively connected to the electric motor 330' and controls actuation of the electric motor. The controller 344' is responsive to signals from a tension sensor 346', a buckle switch 348', and, optionally, a belt position sensor 350'.

The tension sensor 346' senses tension in one or both of the buckle-lowering belts 94 and 96 and provides to the controller 344' signals indicative of the sensed tension. Alternatively, the tension sensor 346' may sense the amperage of the electric motor 330' and output signals indicative of the amperage. Given parameters of the electric motor 330', the amperage of the electric motor 330' may be correlated into a belt tension either in the tension sensor 346' or in the controller 344'.

The buckle switch 348' monitors the latched condition of the buckle assembly 58 and provides to the controller 344' an electronic signal indicating the latched condition of the buckle assembly 58. For example, the buckle switch 348' may provide a five volt signal to the controller 344' when the tongue portion 60 and the buckle portion 62 of the buckle assembly 58 are latched together. The buckle switch 348' may provide a zero volt signal when the tongue portion 60 and the buckle portion 62 of the buckle assembly 58 are unlatched.

The position sensor 350' monitors the position of one of the buckle-lowering belt 94 and 96 and provides a signal to the controller 344' indicating the position of the buckle-lowering belt 94 or 96. The position sensor 350' preferably includes a Hall effect device, indicated generally at 350', and a magnet 352' that is attached to the buckle-lowering belt 96. When the magnet 352' is positioned adjacent the Hall effect device 350', as is shown in FIG. 9, a first signal is provided to the controller 344'. When the magnet 352' is not positioned adjacent the Hall effect device 350', a second signal, different from the first signal, is provided to the controller 344'.

When the four-point seat belt system 30' is placed on the occupant 22, the buckle-lowering belts 94 and 96 may be withdrawn from the housing 302' of the buckle-lowering retractor 300'. The rewind spring 340' is tensioned when the buckle-lowering belts 94 and 96 are withdrawn from the housing 302'. If the position sensor 350' is used, a signal may be sent to the controller 344' indicating that the buckle-lowering belts 94 and 96 have been withdrawn. The signal from the position sensor 350' may be used to wake the controller 344' from a lower power consumption sleep mode so that the controller 344' begins monitoring signals from the buckle switch 348'.

When the controller 344' receives a signal from the buckle switch 348' indicating that the buckle assembly 58 is latched, the controller 344' actuates the electric motor 330' to rotate the spool 324' in a direction for retracting the buckle-lowering belts 94 and 96. When the optional position sensor 350' is not present, the buckle-lowering belts 94 and 96 are retracted until the controller 344' determines that the predefined belt tension has been reached. The predefined belt tension is reached when the buckle assembly 58 is located adjacent the top of the occupant's lap and the occupant's lap resists further lowering of the buckle assembly 58. The predefined belt tension is sufficiently high so as to overcome any frictional resistance to movement of the buckle assembly 58. When the controller 344' determines that the predefined belt tension has been reached, the controller 344' stops the electric motor 330'.

When the optional position sensor 350' is present, the buckle-lowering belts 94 and 96 are retracted until the controller 344' determines that either (a) the buckle-lowering belts 94 and 96 have returned to their the initial positions relative to the housing 302', i.e., magnet 352' is positioned adjacent Hall effect device 350', or (b) the predefined belt tension has been reached. When the controller 344' determines that either (a) the buckle-lowering belts 94 and 96 have returned to their initial position relative to the housing 302', or (b) the predefined belt tension has been reached, the controller 344' stops the electric motor 330'. When the electric motor 330' is stopped, the rewind spring 340' maintains the position of the buckle assembly 58 relative to the occupant's lap. Although the rewind spring 340' is significantly weaker that the combined strengths of the rewind springs of lap belt retractors 44 and 68, the force of rewind spring 340' is sufficient to prevent the buckle assembly 58 from moving upwardly away from the top of the occupant's lap.

When the buckle assembly 58 is unbuckled, the rewind spring 340' rotates the spool 324' toward the first position for retracting the buckle-lowering belts 94 and 96 to their initial positions relative to the housing 302'. Alternatively, the controller 344' may be responsive the signal from the buckle switch 348' for actuating the electric motor 330' to rotate the spool 324' in the retraction direction for retracting the buckle-lowering belts 94 and 96 to their initial positions.

As stated above with regard to FIG. 3, the buckle-lowering retractor 104 allows a predetermined amount of the buckle-lowering belt 94 to be withdrawn from the housing 106 of the buckle-lowering retractor 104. In an exemplary embodiment of the invention, the predetermined amount of the buckle-lowering belt 94 that may be withdrawn from the buckle-lowering retractor 104 is the additional length above the initial length that is necessary to center the buckle assembly 58 in a location adjacent the top of the lap of the ninety-fifth percentile male occupant. It may be desirable to enable an additional amount, beyond the predetermined amount, of the buckle-lowering belts 94 and 96 to be withdrawn from the buckle-lowering retractors 104 and 142. For example, when it is desirable to attach a child safety seat to the seat 10 of the vehicle 12, the predetermine amount of the buckle-lowering belts 94 and 96 may not be sufficient in length to enable the child safety seat to be properly secured to the seat 10. FIGS. 10–12 illustrate an embodiment of the buckle-lowering retractor 104' that enables an additional length of a buckle-lowering belt 94, beyond the predetermined amount, to be withdrawn from the buckle-lowering retractor 104'.

Figure 8:
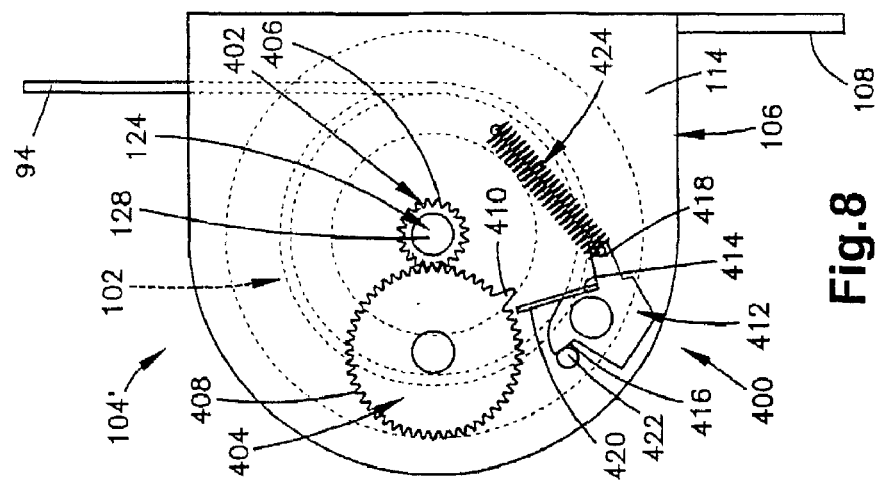
FIG. 8 is a side view of a buckle-lowering retractor having a mechanism for enabling an additional length of a buckle-lowering belt to be withdrawn from the buckle-lowering retractor.

The buckle-lowering retractor 104' of FIGS. 8–10 includes a mechanism 400 for enabling the additional length of a buckle-lowering belt 94 to be withdrawn from the buckle-lowering retractor 104'. The mechanism 400 illustrated in FIGS. 8–10 may be used with any of the buckle-lowering retractors described in FIGS. 1–7. Preferably, the mechanism 400 of FIGS. 8–10 is incorporated into a buckle-lowering retractor having only a rewind spring for retracting the buckle-lowering belt 94 or both buckle-lowering belts 94 and 96, such as the buckle-lowering retractors 104 and 220 illustrated in FIGS. 3 and 6.

The buckle-lowering retractor 104' of FIGS. 8–10 is similar to the buckle-lowering retractor 104 of FIG. 3 with the addition of the mechanism 400. Structures in FIGS. 8–10 that are the same as structures described above with reference to FIG. 3 are numbered using the same reference number as was used in FIG. 3.

The mechanism 400 is formed outward of the second end wall 114 of the housing 106. The housing 106 of the buckle-lowering retractor 104' may include an attachable cover (not shown) for protecting the mechanism 400. The mechanism 400 includes first and second gear wheels 402 and 404, respectively. The first gear wheel 402 is fixedly attached to the second end 128 of the axle 124 of the spool 102 of the buckle-lowering retractor 104'. The first gear wheel 402 rotates with the spool 102 and includes a toothed outer surface 406 having a first diameter. The second gear wheel 404 is rotatably connected to the second end wall 114 of the housing 106. The second gear wheel 404 includes a toothed outer surface 408 having a second diameter. The second diameter is approximately three times larger than the first diameter. The second gear wheel 404 also includes a detent 410 that extends radially outwardly beyond the toothed outer surface 408 of the second gear wheel 404. The first and second gear wheels 402 and 404 are in meshing engagement with one another.

The mechanism 400 also includes a limit member 412. The limit member 412 is pivotally attached to the second end wall 114 of the buckle-lowering retractor 104' in a position below, as viewed in FIG. 10, the second gear wheel 404. The limit member 412 includes a support surface 414, a stopping surface 416, and an extension arm 418. A leaf spring 420 is fixed to the support surface 414 of the limit member 412 and extends outwardly from the limit member toward the second gear wheel 404. The leaf spring 420 is flat and has a tendency to remain flat.

The mechanism 400 also includes a stopping peg 422 and an extension spring 424. The stopping peg 422 extends outwardly from the second end wall 114 of the housing 106 in a location adjacent the limit member 412. When the stopping surface 416 of the limit member 412 engages the stopping peg 422, the leaf spring 420 terminates near the toothed outer surface 408 of the second gear wheel 404. The stopping peg 422 prevents rotation of the limit member 412 in a counter-clockwise direction, as viewed in FIG. 8, relative to the second end wall 114 of the buckle-lowering retractor 104'. The extension spring 424 extends between the extension arm 418 of the limit member 412 and the second end wall 114 of the housing 106. The extension spring 424 illustrated in FIG. 8 pulls the extension arm 418 in a direction tending to rotate the limit member 412 counter-clockwise.

When the spool 102 of the buckle-lowering retractor 104' is in a first position and the initial length of the buckle-lowering belt 94 extends between buckle-lowering retractor 104' and the associated portion of the buckle assembly 58, e.g., the tongue portion 60, the detent 410 of the second gear wheel 404 is positioned immediately below the meshing engagement of the first and second gear wheels 402 and 404. As the buckle-lowering belt 94 is withdrawn from the buckle-lowering retractor 104', the spool 102 of the buckle-lowering retractor 104' rotates in the counter-clockwise direction, as viewed in FIG. 8. The counter-clockwise rotation of the spool 102 rotates the first gear wheel 402 in the counter-clockwise direction. Counter-clockwise rotation of the first gear wheel 402 results in clockwise rotation of the second gear wheel 404. As a result, the detent 410 on the second gear wheel 404 moves toward the leaf spring 420. When the predetermined amount of the buckle-lowering belt 94 has been withdrawn from the housing 106 of the buckle-lowering retractor 104', the detent 410 engages right side surface of the leaf spring 420. The leaf spring 420 resists further clockwise rotation of the second gear wheel 404. As a result, the leaf spring 420 resists further rotation of the spool 102 and further withdrawal of the buckle-lowering belt 94. Thus, the leaf spring 420 provides resistance to withdrawal of the buckle-lowering belt 94 beyond the predetermined amount.

When the additional length of the buckle-lowering belt 94 is needed, the occupant 22 of the seat 10 must pull upwardly, as viewed in FIG. 8, on the buckle-lowering belt 94 with a force sufficient to cause the detent 410 to overcome the resistance of the leaf spring 420 and to rotate beyond the leaf spring 420. After the detent 410 of the second gear wheel 404 rotates beyond the leaf spring 420, as is shown in FIG. 9, the additional length of the buckle-lowering belt 94 may be withdrawn from the buckle-lowering retractor 104' with only the force necessary to overcome the rewind spring 136 of the buckle-lowering retractor 104'.

When the additional length of the buckle-lowering belt 94 is being retracted onto the spool 102 of the buckle-lowering retractor 104', the detent 410 on the second gear wheel 404 engages the left side surface of the leaf spring 420, as is shown in FIG. 10. The force of the rewind spring 136 of the buckle-lowering retractor 104' acts through the gear wheels 402 and 404 to force the detent 410 against the left side surface of the leaf spring 420. The force of the detent 410 on the left side surface of the leaf spring 420 is sufficient enough to overcome the bias of the extension spring 424. As a result, the limit member 412 pivots clockwise, as shown in FIG. 10, until the detent 410 rotates counter-clockwise beyond the leaf spring 420. The extension spring 424 then pivots the limit member 412 counter-clockwise, as viewed in FIG. 10, until the stopping surface 416 engages the stopping peg 422.

From the above description of the invention, those skilled in the art will perceive improvements, changes and modifications. Such improvements, changes and modifications within the skill of the art are intended to be covered by the appended claims.

Having described the invention, we claim the following:

1. An occupant restraint system for helping to protect an occupant of a seat of a vehicle, the occupant restraint system comprising:
    first and second lap belts for collectively extending across a lap of the occupant;
    first and second shoulder belts for extending over the shoulders of the occupant;
    a buckle assembly for interconnecting the lap belts and the shoulder belts, and
    first and second buckle-lowering belts attached to the buckle assembly, a device operatively associated with at least one of said first and second buckle-lowering belts, said device comprising one of a motor and a spring, said one of a motor and a spring creating a downwardly acting biasing force on the buckle assembly so as to move the buckle assembly downwardly relative to the seat and towards the lap of the occupant.

2. The occupant restraint system of claim 1 wherein the first and second buckle-lowering belts also collectively extend across the lap of the occupant.

3. An occupant restraint system for helping to protect an occupant of a seat of a vehicle, the occupant restraint system comprising:
    first and second lap belts for collectively extending across a lap of the occupant;
    first and second shoulder belts for extending over the shoulders of the occupant;
    a buckle assembly for interconnecting the lap belts and the shoulder belts, and
    first and second buckle-lowering belts attached to the buckle assembly for creating a downwardly acting biasing force on the buckle assembly so as to move the buckle assembly downwardly relative to the seat and towards the lap of the occupant, wherein the first and second buckle-lowering belts also collectively extend across the lap of the occupant, at least one buckle-lowering retractor, the first buckle-lowering belt having a first end that is attached to the buckle assembly and a second end that is attached to the at least one buckle-lowering retractor, the second buckle-lowering belt having a first end that is attached to the buckle assembly and a second end that is attached to the at least one buckle-lowering retractor.

4. The occupant restrains system of claim 3 further including at least one lap belt retractor for the first and second lap belts, the at least one buckle-lowering retractor located forward relative to of the at least one lap belt retractor.

5. The occupant restraint system of claim 3 wherein an initial length of the first buckle-lowering belt extends between the at least one buckle-lowering retractor and the buckle assembly and an initial length of the second buckle-lowering belt extends between the at least one buckle-lowering retractor and the buckle assembly, the initial length of the first buckle-lowering belt and the initial length of the second buckle-lowering belt being substantially equal.

6. The occupant restraint system of claim 5 wherein a predetermined amount of the first buckle-lowering belt may be withdrawn from the at least one buckle-lowering retractor and a predetermined amount of the second buckle-lowering belt may be withdrawn from the at least one buckle-lowering retractor.

7. The occupant restraint system of claim 5 wherein the at least one buckle-lowering retractor includes a spool having first and second belt-receiving portions and a rewind spring, a portion of the first buckle-lowering belt being wound around the first belt-receiving portion of the spool and a portion of the second buckle-lowering belt being wound around the second belt-receiving portion of the spool, the rewind spring biasing the spool into a first position relative to the at least one buckle-lowering retractor, the initial lengths of the first and second buckle-lowering belts extending between the at least one buckle-lowering retractor and the buckle assembly when the spool is in the first position.

8. The occupant restraint system of claim 7 wherein the at least one buckle-lowering retractor further includes an electric motor operatively connected to the spool and actuatable for rotating the spool in a direction for retracting the first and second buckle-lowering belts.

9. The occupant restraint system of claim 8 further including a controller for controlling actuation of the electric motor, the controller being responsive to a latch signal from a buckle switch and at least one of a tension signal from a tension sensor and a position signal from a position sensor.

10. The occupant restraint system of claim 6 wherein the at least one buckle-lowering retractor includes a mechanism for resisting withdrawal of the first buckle-lowering belt beyond the predetermined amount, the mechanism being actuatable for enabling withdrawal of the first buckle-lowering belt beyond the predetermined amount.

11. The occupant restraint system of claim 10 wherein the mechanism includes at least one gear wheel that is rotated in response to rotation of a spool of the at least one buckle-lowering retractor, the at least one gear wheel including a detent, the mechanism further including a member for engaging the detent to resist rotation of the at least one gear wheel and thereby, resist withdrawal of the first buckle-lowering belt beyond the predetermined amount, the detent rotating past the member upon actuation of the mechanism for enabling withdrawal of the first buckle-lowering belt beyond the predetermined amount.

12. The occupant restraint system of claim 11 wherein the member for engaging the detent of the at least one gear wheel includes a leaf spring, the mechanism being actuatable by a predefined force applied to the first buckle-lowering belt, the detent flexing the leaf spring and rotating past the leaf spring when the predefined force is applied to the first buckle-lowering belt.

13. The occupant restraint system of claim 11 wherein the member is rotatably mounted to the at least one buckle-lowering retractor, the detent of the at least one gear wheel, during rotation of the spool in a direction for retracting the first buckle-lowering belt, engaging the member and rotating the member to enable the detent to rotate past the member, the at least one buckle-lowering retractor including structure for resisting rotation of the member during withdrawal of the first buckle-lowering belt.

14. The occupant restraint system of claim 3 wherein the at least one buckle-lowering retractor further includes at least one electric motor operable for retracting the first and second buckle-lowering belts.

15. The occupant restraint system of claim 14 further including at least one controller for controlling actuation of the at least one electric motor of the at least one buckle-lowering retractor, the controller being responsive to a latch signal from a buckle switch and at least one of a tension signal from a first tension sensor and a position signal from a first position sensor.

16. The occupant restraint system of claim 3 wherein the at least one buckle-lowering retractor includes a spring having opposite first and second ends and a middle portion, the middle portion of the spring being fixed relative to the seat, the second end of the first buckle-lowering belt being attached to the first end of the spring and the second end of the second buckle-lowering belt being attached to the second end of the spring.

17. The occupant restraint system of claim 3 further including a first guide for guiding the first buckle-lowering belt between the at least one buckle-lowering retractor and the buckle assembly and a second guide for guiding the second buckle-lowering belt between the at least one buckle-lowering retractor and the buckle assembly.

18. An occupant restraint system for helping to protect an occupant of a seat of a vehicle, the occupant restraint system comprising:
 first and second lap belts for collectively extending across a lap of the occupant;
 first and second shoulder belts for extending over the shoulders of the occupant;
 a buckle assembly for interconnecting the lap belts and the shoulder belts, and
 first and second buckle-lowering belts attached to the buckle assembly for creating a downwardly acting biasing force on the buckle assembly so as to move the buckle assembly downwardly relative to the seat and towards the lap of the occupant, wherein the first and second buckle-lowering belts also collectively extend across the lap of the occupant, at least a first buckle-lowering retractor, the first buckle-lowering belt having a first end that is attached to the buckle assembly and a second end that is attached to said first buckle-lowering retractor.

19. The occupant restraint system of claim 18 including a second buckle-lowering retractor, said second buckle-lowering belt having a first end that is attached to the buckle assembly and a second end that is attached to said second buckle-lowering retractor.

20. The occupant restraint system of claim 19 wherein an initial length of the first buckle-lowering belt extends between said first buckle-lowering retractor and the buckle assembly and an initial length of the second buckle-lowering belt extends between said second buckle-lowering retractor and the buckle assembly, the initial length of the first buckle-lowering belt and the initial length of the second buckle-lowering belt being substantially equal.

21. The occupant restraint system of claim 20 wherein a predetermined amount of the first buckle-lowering belt may be withdrawn from said first buckle-lowering retractor and a predetermined amount of the second buckle-lowering belt may be withdrawn from said second buckle-lowering retractor.

22. The occupant restraint system of claim 21 wherein said first buckle-lowering retractor is located on a first side of the seat and said second buckle-lowering retractor is located on a second side of the seat, opposite the first side, the second end of the first buckle-lowering belt being attached to said first buckle-lowering retractor and the second end of the second buckle-lowering belt being attached to said second buckle-lowering retractor.

23. The occupant restraint system of claim 22 wherein said first buckle-lowering retractor includes a first spool and a first rewind spring, a portion of the first buckle-lowering belt being wound around the first spool, the first rewind spring biasing the first spool into a first position relative to the first buckle-lowering retractor, the initial length of the first buckle-lowering belt extending between the first buckle-lowering retractor and the buckle assembly when the first spool is in the first position, the second buckle-lowering retractor includes a second spool and a second rewind spring, a portion of the second buckle-lowering belt being wound around the second spool, the second rewind spring biasing the second spool into a first position relative to the second buckle-lowering retractor, the initial length of the second buckle-lowering belt extending between the second buckle-lowering retractor and the buckle assembly when the second spool is in the first position.

24. The occupant restraint system of claim 23 wherein the first and second rewind springs tend to center the buckle assembly relative to the lap of the occupant when more than the initial lengths of the first and second buckle-lowering belts are withdrawn from the first and second buckle-lowering retractors, respectively.

25. The occupant restraint system of claim 23 wherein the at least one buckle-lowering retractor further includes an electric motor operatively connected to the first spool and actuatable for rotating the first spool in a direction for retracting the first buckle-lowering belt.

26. The occupant restraint system of claim 25 further including a controller for controlling actuation of the electric motor, the controller being responsive to a latch signal from a buckle switch and at least one of a tension signal from a tension sensor and a position signal from a position sensor.

27. The occupant restraint system of claim 21 wherein the first buckle-lowering retractor includes a mechanism for resisting withdrawal of the first buckle-lowering belt beyond the predetermined amount, the mechanism being actuatable for enabling withdrawal of the first buckle-lowering belt beyond the predetermined amount.

28. The occupant restraint system of claim 27 wherein the mechanism includes at least one gear wheel that is rotated in response to rotation of a spool of the first buckle-lowering retractor, the at least one gear wheel including a detent, the mechanism further including a member for engaging the detent to resist rotation of the at least one gear wheel and thereby, resist withdrawal of the first buckle-lowering belt beyond the predetermined amount, the detent rotating past the member upon actuation of the mechanism for enabling withdrawal of the first buckle-lowering belt beyond the predetermined amount.

29. The occupant restraint system of claim 28 wherein the member for engaging the detent of the at least one gear wheel includes a leaf spring, the mechanism being actuatable by a predefined force applied to the first buckle-lowering belt, the detent flexing the leaf spring and rotating past the leaf spring when the predefined force is applied to the first buckle-lowering belt.

30. The occupant restraint system of claim 29 wherein the member is rotatably mounted to the first buckle-lowering retractor, the detent of the at least one gear wheel, during rotation of the spool in a direction for retracting the first buckle-lowering belt, engaging the member and rotating the member to enable the detent to rotate past the member, the first buckle-lowering retractor including structure for resisting rotation of the member during withdrawal of the first buckle-lowering belt.

31. The occupant restraint system of claim 19 wherein said first buckle-lowering retractor further includes at least one electric motor operable for retracting the first buckle-lowering belt.

32. The occupant restraint system of claim 31 further including at least one controller for controlling actuation of the at least one electric motor of the first buckle-lowering retractor, the controller being responsive to a latch signal from a buckle switch and at least one of a tension signal from a first tension sensor and a position signal from a first position sensor.

33. The occupant restraint system of claim 19 further including a first guide for guiding the first buckle-lowering belt between the at least one buckle-lowering retractor and the buckle assembly and a second guide for guiding the second buckle-lowering belt between the at least one buckle-lowering retractor and the buckle assembly.

* * * * *